United States Patent
Sasaki et al.

(10) Patent No.: US 7,644,234 B2
(45) Date of Patent: Jan. 5, 2010

(54) INFORMATION PROCESSING APPARATUS WITH A CACHE MEMORY AND INFORMATION PROCESSING METHOD

(75) Inventors: Nobuo Sasaki, Kanagawa (JP); Takeshi Yamazaki, Kanagawa (JP); Atsushi Kunimatsu, Kanagawa (JP); Hideki Yasukawa, Kanagawa (JP)

(73) Assignees: Sony Computer Entertainment Inc., Tokyo (JP); Kabushiki Kaisha Toshiba, Tokyo (JP)

( * ) Notice: Subject to any disclaimer, the term of this patent is extended or adjusted under 35 U.S.C. 154(b) by 680 days.

(21) Appl. No.: 11/141,700

(22) Filed: May 31, 2005

(65) Prior Publication Data

US 2005/0275658 A1 Dec. 15, 2005

(30) Foreign Application Priority Data

May 31, 2004 (JP) ............................... 2004-162636

(51) Int. Cl.
*G06F 12/08* (2006.01)
*G06F 13/00* (2006.01)

(52) U.S. Cl. ........................ 711/128; 711/130; 711/133; 711/137; 711/154

(58) Field of Classification Search .................... 711/3, 711/100, 104, 117, 118, 119, 154, 200, 202, 711/128, 130, 133, 137
See application file for complete search history.

(56) References Cited

U.S. PATENT DOCUMENTS 5,285,323 A * 2/1994 Hetherington et al. ...... 711/122

(Continued)

FOREIGN PATENT DOCUMENTS

JP 57-120284 7/1982

(Continued)

OTHER PUBLICATIONS

International Search Report dated Feb. 7, 2006 from corresponding International Application PCT/JP2005/010283.

(Continued)

*Primary Examiner*—Tuan Van Thai
(74) *Attorney, Agent, or Firm*—Katten Muchin Rosenman LLP

(57) ABSTRACT

A secondary texture cache is used commonly by a plurality of texture units, and stores part of texture data in a main memory. A cache controlling CPU controls a refill operation from the main memory to the secondary texture cache in accordance with cache misses of the plurality of texture units, so as to suppress occurrence of thrashing in the secondary texture cache. The cache controlling CPU suppresses occurrence of the refill operation when the plurality of operating units access an identical memory address with a predetermined time difference.

7 Claims, 13 Drawing Sheets

U.S. PATENT DOCUMENTS

| | | | | |
|---|---|---|---|---|
| 5,732,242 | A * | 3/1998 | Mowry | 711/136 |
| 5,875,464 | A * | 2/1999 | Kirk | 711/129 |
| 6,216,200 | B1 * | 4/2001 | Yeager | 711/100 |
| 6,629,188 | B1 | 9/2003 | Minkin et al. | |
| 2002/0099912 | A1 | 7/2002 | Nakamura et al. | |
| 2003/0093644 | A1 | 5/2003 | Fanning | |
| 2003/0218608 | A1 | 11/2003 | Chin et al. | |

FOREIGN PATENT DOCUMENTS

| | | |
|---|---|---|
| JP | 58-97185 | 6/1983 |
| JP | 62-224846 | 10/1987 |
| JP | 01-230153 | 9/1989 |
| JP | 4-15736 | 1/1992 |
| JP | 05-143451 | 6/1993 |
| JP | 08-123727 | 5/1996 |
| JP | 09212661 | 8/1997 |
| JP | 2822588 | 9/1998 |
| JP | 11-143775 | 5/1999 |
| JP | 2003-515798 | 7/2003 |

OTHER PUBLICATIONS

Notification of Transmittal dated Feb. 17, 2006 from corresponding International Application PCT/JP2005/010283.

Written Opinion of the International Searching Authority dated Feb. 17, 2006 from corresponding International Application PCT/JP2005/010283.

Notification of Reason(s) for Refusal dated Mar. 10, 2009, from the corresponding Japanese Application.

Chinese Second Office Action dated Apr. 17, 2009, from the corresponding Chinese Application.

Notice of Reason(s) for Refusal dated Nov. 10, 2009 for corresponding Japanese Application No. 2004-162636.

* cited by examiner

INFORMATION PROCESSING APPARATUS WITH A CACHE MEMORY AND INFORMATION PROCESSING METHOD

BACKGROUND OF THE INVENTION

1. Field of the Invention

The present invention relates to a technology for reading data from a main memory at higher speed, and more particularly to a technology for using a cache memory for acceleration.

2. Description of the Related Art

In recent years, processors have been improved dramatically in the operating frequency. In contrast, dynamic random access memories (DRAMS) typically used as main memories have not been so much improved in the operating frequency as the processors. Taking advantage of the processor performances thus requires some contrivance. The access times of the main memories have been reduced by using the technique of interposing a cache memory between a main memory and a processor.

Nevertheless, even if the processor accesses the cache for a designated address, the cache does not always contain the desired data. In such cases, a cache miss occurs to require a refill from the main memory. When cache misses like this occur frequently, the cache not only tails to contribute to acceleration but also causes overhead.

SUMMARY OF THE INVENTION

The present invention has been achieved in view of the foregoing problem. It is thus an object of the present invention to provide an information processing apparatus and an information processing method for reducing cache misses for the sake of faster data read.

One of the aspects of the present invention is an information processing apparatus. This apparatus comprises: a cache memory which stores part of data in a main memory, the cache memory being used commonly by a plurality of operating units; and a control unit which controls a refill operation from the main memory to the cache memory in accordance with at least one cache miss from the plurality of operating units, so as to suppress occurrence of threshing in the cache memory. Here, the "data" may cover texture data. The "operating units" may cover texture units. The "thrashing" may refer to a state where swap-in and swap-out of identical data occur intermittently between the main memory and the cache memory.

Another aspect of the present invention is also an information processing apparatus. This apparatus comprises: a cache memory having a plurality of ways for storing part of data in a main memory, the cache memory being used commonly by a plurality of operating units; a cache management unit which manages cache tags and states of entry for the respective ways; and a control unit which controls a refill operation from the main memory to the cache memory and the states of entry in accordance with a refill request from the cache management unit, the refill request occurring from at least one cache miss from the plurality of operating units.

The control unit may suppress occurrence of the refill operation when the plurality of operating units access an identical memory address with a predetermined time difference. When the control unit receives a plurality of refill requests to an identical memory address, it may suspend the refill operation corresponding to the refill request of the second henceforth. When the control unit receives a plurality of refill requests to an identical memory address, it may also suspend entry lock corresponding to the refill request of the second henceforth. Moreover, the control unit may accumulate a predetermined number of refill requests occurring from cache misses before performing the refill operation.

Another aspect of the present invention is also an information processing apparatus. This apparatus comprises: a cache memory which stores part of data in a main memory, the cache memory being used commonly by a plurality of operating units; and a control unit which controls a refill operation from the main memory to the cache memory in accordance with a plurality of refill requests occurring from cache misses from the plurality of operating units. Here, the control unit sets entry lock corresponding to the refill request on the cache memory after a lapse of a predetermined time since the refill operation is started.

Still another aspect of the present invention is also an information processing apparatus. This apparatus comprises: a cache memory which stores part of data in a main memory, the cache memory being used commonly by a plurality of operating units; an intermediate buffer interposed between the main memory and the cache memory; and a control unit which controls a refill operation from the main memory to the cache memory, via the intermediate buffer in accordance with a plurality of refill requests occurring from cache misses of the plurality of operating units. Here, the control unit sets entry lock corresponding to the refill request on the cache memory when data to be passed to the cache memory by the refill operation is stored into the intermediate buffer.

Still another aspect of the present invention is also an information processing apparatus. This apparatus comprises: a cache memory which stores part of data in a main memory, the cache memory being used commonly by a plurality of operating units; and a control unit which controls a refill operation from the main memory to the cache memory in accordance with a refill request occurring from at least one cache miss from the plurality of operating units, and predicts texture data to be used by the plurality of operating units and controls a prefetch operation from the main memory to the cache memory. The cache memory includes an area to be refilled in accordance with the cache miss, and an area to be entry-locked for a prefetch. The control unit may switch the two areas under a predetermined condition.

Still another aspect of the present invention is also an information processing apparatus. This apparatus comprises: a cache memory which stores part of texture data stored in a main memory, the cache memory being used commonly by operating units; and a control unit which predicts texture data to be used by the operating units and prefetches a line containing the texture data from the main memory to the cache memory. The control unit may prefetch texture data necessary for a start scene to be used by the operating units in performing a predetermined program.

Still another aspect of the present invention is an information processing method. This method comprises: arbitrating between a plurality of refill requests occurring from cache misses from a plurality of operating units accessing a cache memory, so as to suppress occurrence of thrashing in the cache memory; and performing a refill from a main memory to the cache memory in accordance with an arbitrated refill request. The aforementioned arbitration may suppress occurrence of the refill when the plurality of operating units access an identical memory address with a predetermined time difference. The occurrence of the refill may be suppressed until a predetermined number of refill requests are accumulated.

Still another aspect of the present invention is an information processing method. This method comprises: arbitrating between a plurality of refill requests occurring from cache misses from a plurality of operating units accessing a cache memory; performing a refill from a main memory to the cache memory in accordance with an arbitrated refill request; and setting entry locks corresponding to the refill requests on the cache memory after a lapse of a predetermined time since the refill is started.

Still another aspect of the present invention is an information processing method. This method comprises: predicting texture data to be used by an operating unit; and prefetching a line containing the predicted texture data from a main memory to a cache memory. In the aforementioned prediction, texture data necessary for a start scene to be used by the operating unit in performing a predetermined program may be predicted as the data to be prefetched.

Incidentally, any combinations of the foregoing components, and the expressions of the present invention converted among methods, apparatuses systems, recording media, computer programs, and the like are also intended to constitute applicable aspects of the present invention.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
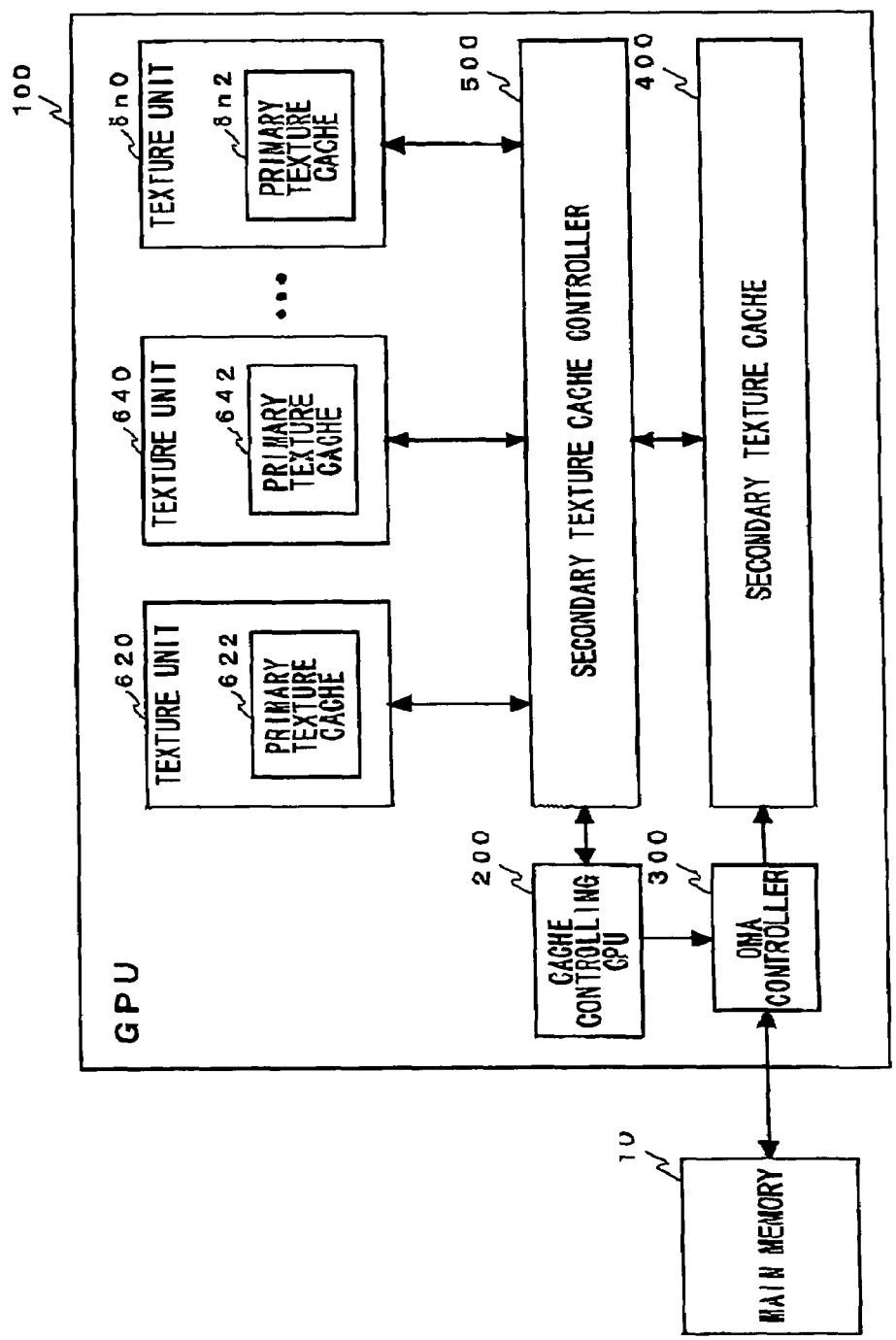
FIG. 1 is a block diagram showing the configuration of a main memory and a GPU according to a first embodiment.

FIG. 1 is a block diagram showing the configuration of a main memory 10 and a graphics processing unit (GPU) 100 according to a first embodiment. The main memory 10 is the main memory of the system, and is composed of a DRAM or the like. In the present embodiment, the main memory 10 chiefly contains texture data. The GPU 100 is a semiconductor chip for carrying out calculations and rendering necessary for three-dimensional graphic display. The GPU 100 incorporates a plurality of texture units 620 to 6n0 which correspond to a plurality of not-shown shader units. The incorporation of the plurality of units improves the rendering speed for the sake of smoother scene transition and the like.

The texture units 620 to 6n0 have primary texture caches 622 to 6n2, respectively. The texture unit 620 receives parameter inputs for specifying texture data from the not-shown shader unit, and designates an address in the main memory space to request texture-constituting texel data from the primary texture cache 622. If the primary texture cache 622 hits with this request, it passes the texel data to the texture unit 620. If it misses, the primary texture cache 622 requests a secondary texture cache controller 500 to read the data from a secondary texture cache 400. Subsequently, the texture unit 620 stalls until the texel data of the corresponding address is read from the secondary texture cache 400. The other texture units operate in the same way.

The secondary texture cache controller 500 manages the texture data on the main memory 10, stored in the secondary texture cache 400. The secondary texture cache controller 500 has cache tags. The cache tags are intended to determine whether or not the secondary texture cache 400 contains the pieces of texture data on the main memory 10 corresponding to read requests from the texture units 620 to 6n0. The cache tags are part of addresses on the main memory 10. A cache hit occurs if part of a read-requested address and a cache tag match with each other. If no match, a cache miss occurs.

When the secondary texture cache 400 does not contain the texture data under read requests from the texture units 620 to 6n0, i.e., in the cases of a cache miss, the secondary texture cache controller 500 issues a refill request to a cache controlling CPU 200. The refill request is intended to request that desired texture data be transferred from the main memory 10 to the secondary texture cache 400. If the secondary texture cache 400 contains the texture data under read requests from the texture units 620 to 6n0, i.e., in the cases of a cache hit, the texture data is transferred to the texture units 620 to 6n0.

The secondary texture cache controller 500 has at least two or more ways. This makes it possible to provide ways both for prefetching and for refilling. Available cache modes include direct mapping, N-way set associative, and full associative. When the N-way set associative is adopted, content addressable memories (CAMs) may be used to perform matching comparisons in parallel. When a suspension request is issued prom the cache controlling CPU 200, the secondary texture cache controller 500 suspends the operation of the way requested. In this state, the cache tag of that way can be rewritten by the cache controlling CPU 200. The suspended state is also entered when all the requests from the texture units 620 to 6n0 turn out to be cache misses.

When an operation resume request is issued from the cache controlling CPU 200, the operation of the way requested is resumed. When the transfer of texture data from the main memory 10 to the secondary texture cache 400 completes during the suspended period, the read request from the corresponding texture unit is retried. The texture data is thus transferred to the texture unit by a cache hit operation.

The secondary texture cache 400 is an area for storing the texture data on the main memory 10 temporarily. The secondary texture cache 400 may be constructed on part of the area of an embedded dynamic random access memory (EDRAM).

Based on an instruction from the cache controlling CPU 200 to a DMA (direct memory access) controller 300, the texture data on the main memory 10 is DMA transferred to the secondary texture cache 400. The texture data is transferred in units of 16 bytes, 32 bytes, or the like which are called lines. At the end of this transfer, the cache controlling CPU 200 rewrites the cache tag in the secondary texture cache controller 500. When the texture units 620 to 6$n$0 issue read requests for the texture data on the secondary texture cache 400, the secondary texture cache controller 500 transfers the corresponding texture data on the secondary texture cache 400 to the primary texture caches 622 to 6n2 automatically.

Under an instruction from the cache controlling CPU 200, the DMA controller 300 generates address signals and transfers the texture data from the main memory 10 to the secondary texture cache 400 without the medium of the CPU.

The transfer between the main memory 10 and the secondary texture cache 400 is not limited to a chip-to-chip transfer, but may be a network-based transfer as well. For example, the main memory 10 may be configured on a server on the Internet, and the secondary texture cache 400 on a client.

The cache controlling CPU 200 arbitrates between a plurality of refill requests through the secondary texture cache controller 500, and issues instructions to the DMA controller 300. Here, the cache control is effected by running a cache controlling program on a not-shown RAM.

Figure 2:
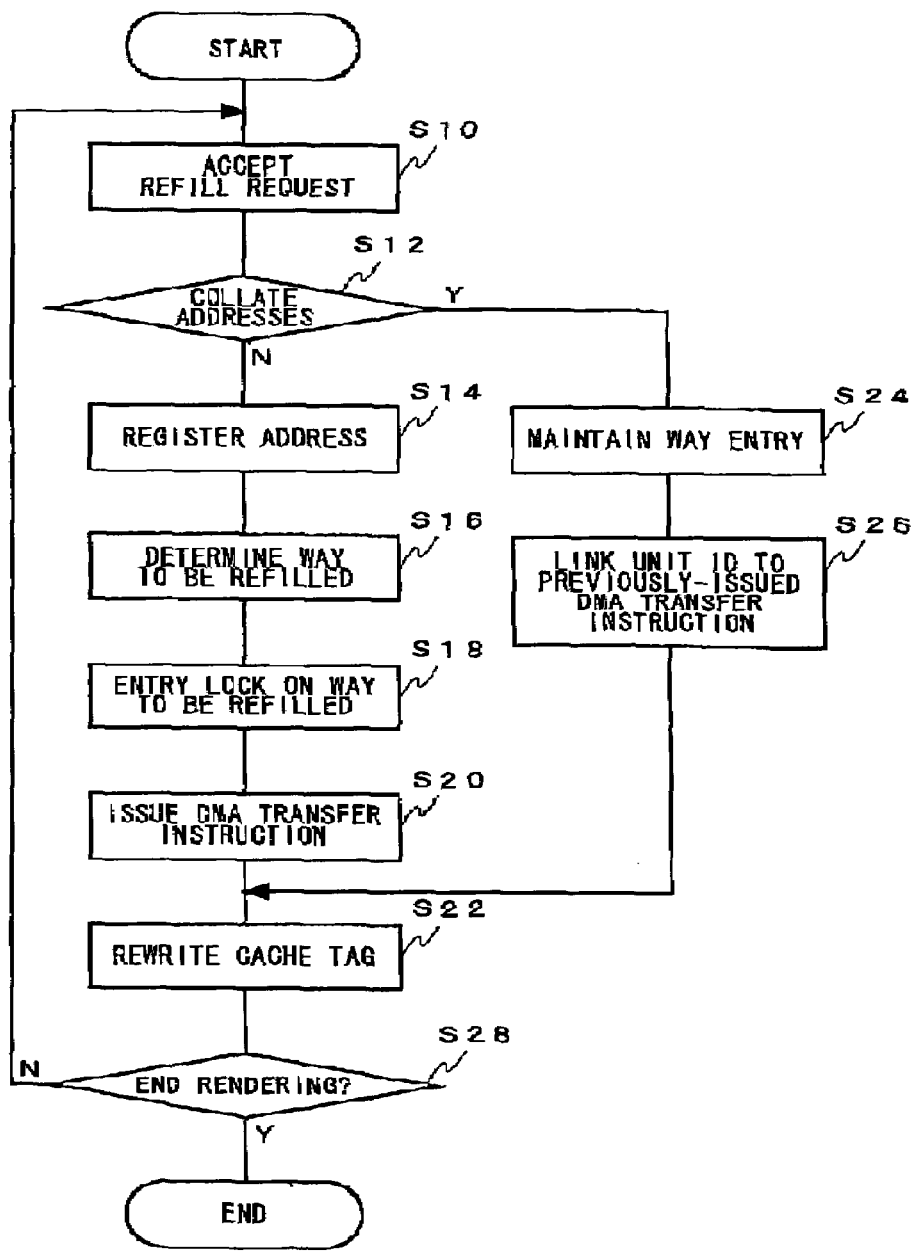
FIG. 2 is a flowchart showing a first operation example of the system according to the first embodiment.

FIG. 2 is a flowchart showing a first operation example of the system according to the first embodiment. Initially, the following description will be given on the assumption that the secondary texture cache 400 has a 4-way configuration in principle. A read request for texture data that has caused a miss in the primary texture cache 622 reaches the secondary texture cache controller 500 from the texture unit 620. If the texture data is found in the secondary texture cache 400, the secondary texture cachet controller 500 transfers the data to the primary texture cache 622. If not, the secondary texture cache controller 500 transmits a refill request to the cache controlling CPU 200. Here, the data transfer operation to the texture unit 620 that has originated the read request is suspended. Besides, an ID number of the texture unit 620 that has originated the read request is delivered to the cache controlling CPU 200.

In FIG. 2, the cache controlling CPU 200 accepts a refill request for texture data from the secondary texture cache controller 500 (S10). The cache controlling CPU 200 determines whether or not the address of the target of this refill request matches with that of a refill request accepted previously (S12). To be more specific, the two addresses are collated. This determination process is performed if the addresses of refill requests accepted previously are registered. When the addresses are not registered, i.e., when in an initial stage, the processing skips to step S14.

In general, a plurality of refill requests rarely occur for an identical address. The present embodiment, however, deals with the environment where such requests can occur easily. For faster processing, the texture units 620 to 6$n$0 perform texture mapping in parallel. The plurality of texture units 620 to 6$n$0 are provided with the respective primary texture caches 622 to 6$n$2. For the sake of bilinear, trilinear, and other filtering processes, requests from the texture units 620 to 6$n$0 often include ones for adjoining texels. Then, it is often the case that the primary texture caches 622 to 6$n$2 of different texture units 620 to 6$n$0 must retain information on mutually-adjoining texel blocks overlappingly.

Figure 3:
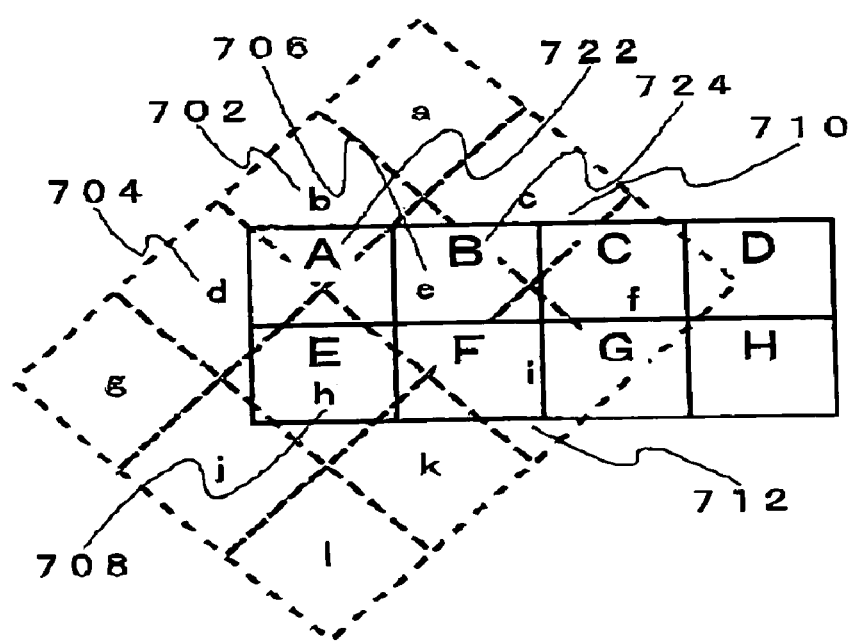
FIG. 3 is a diagram showing how texture mapping is carried out by a plurality of texture units.

FIG. 3 shows how texture mapping is carried out by the plurality of texture units 620 to 6$n$0. The plurality of texture units 620 to 6$n$0 map textures into frame buffer areas A to H which are divided and nested in 4×4 pixels or so. The processing is performed in parallel, for example, so that one texture unit 620 maps textures to an A area 722 of the frame buffer, and another texture unit 640 to a B area 724 of the frame buffer. The portion shown in dotted lines represents an object created by a plurality of textures a to l.

The texture unit 620 for mapping to the A area 722 of the frame buffer must read and map four pieces of texture data b, d, e, and h, or 702, 704, 706, and 708, from the primary texture cache 622 of its own. The texture unit 640 for mapping to the B area 724 of the frame buffer must read and map three pieces of texture data e, c, and i, or 706, 710, and 712, from the primary texture cache 642 of its own. Here, the piece of texture data e, or 706, is used by both the texture unit 620 and the texture unit 640. Consequently, read requests for the texture data of the same address may reach the secondary texture cache controller 500 from the plurality of texture units 620 and 640 with some difference in time. Besides, when the secondary texture cache 400 is constructed on an EDRAM, a high latency can occur in the DMA transfer between the secondary texture cache 400 and the main memory 10. This increases, the possibility that a refill request for a certain address might reach the cache controlling CPU 200 before the refill of the texture data of the same address is completed. The more the texture units 620 to 6$n$0 in number, the higher the possibility of overlapping refill requests. Three or more refill requests can even occur overlappingly.

Figure 4:
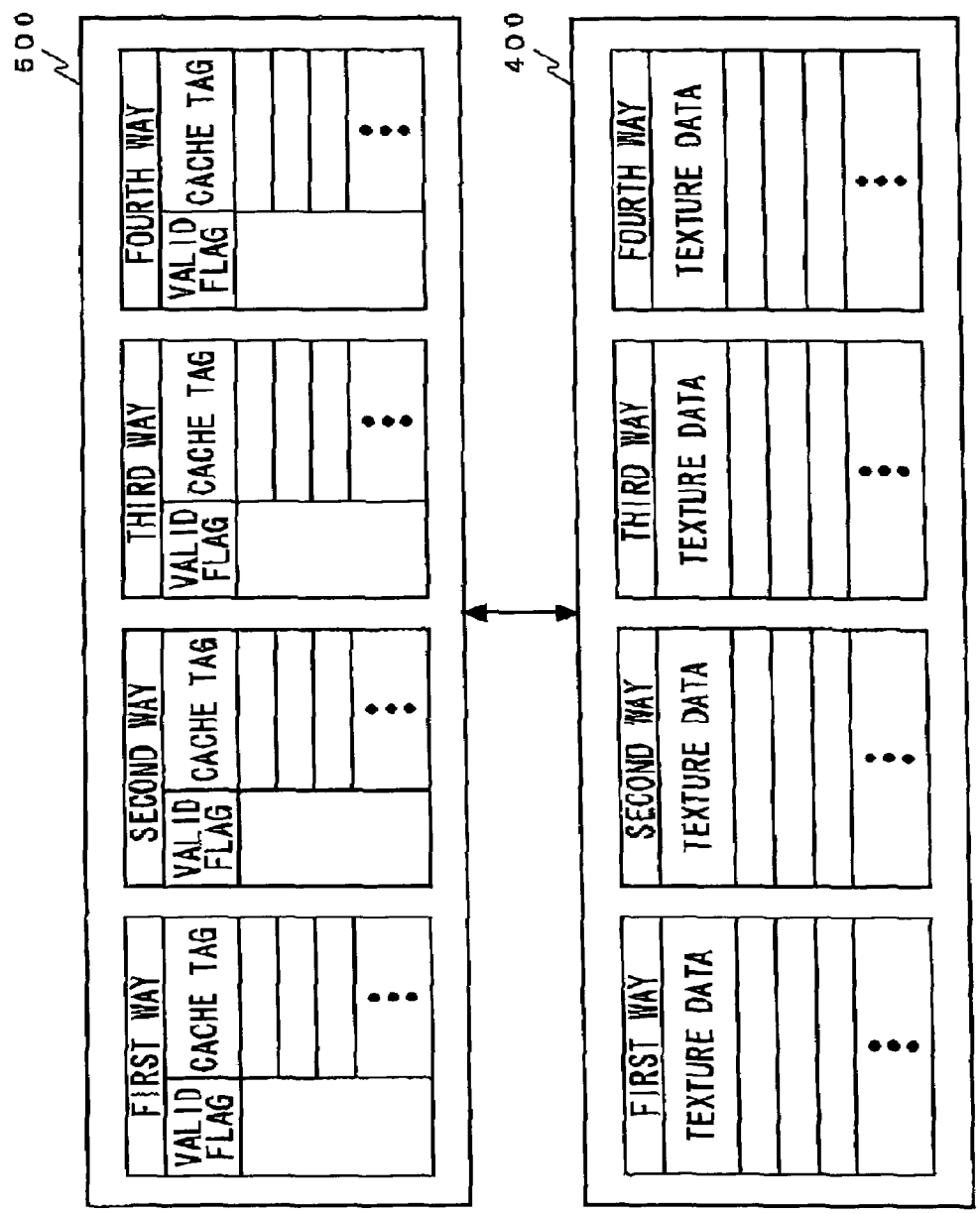
FIG. 4 is a diagram showing the details of a secondary texture cache and a secondary texture cache controller.

Returning to FIG. 2, at step S12, if the address does not match with the registered ones (N at S12), the target address of the refill request is registered into a not-shown register or the like in the cache controlling CPU 200 (S14). Next, the cache controlling CPU 200 determines the target address to be replaced by the DMA transfer, i.e., the way to be replaced (S16). Various algorithms are available for this determination. When one single way of the secondary texture cache 400 can accommodate most of the texture data, one of the ways may be dedicated to the refill purpose. Otherwise, a FIFO (First-In First-Out) memory or LRU (Least Recently Used) memory may be used simply Next, the cache controlling CPU 200 locks entry to the determined way (S18). Description will now be given of the method of locking entry to a way FIG. 4 shows the details of the secondary texture cache 400 and the secondary texture cache controller 500. The secondary texture cache 400 caches texture data way by way, in units of lines. The secondary texture cache controller 500 manages the secondary texture cache 400 way by way. The secondary texture cache controller 500 has valid flags for the respective ways, and manages whether the respective ways are valid or invalid. For example, when the valid flags are made of 1-bit flag registers, it is possible to establish such settings as 1 for valid and 0 for invalid. In a valid state, the corresponding ways in the secondary texture cache 400 can be accessed from the texture units 620 to 6$n$0. In an invalid state, the accesses are locked out. The valid flags are rewritten and controlled by the cache controlling CPU 200.

The secondary texture cache controller 500 also manages part of the addresses of the texture data in the memory space of the main memory 10, cached in the secondary texture cache 400, as the cache tags of the respective ways. Then, the read-requested address and the addresses in the cache tags are compared to determine whether a cache hit or a cache miss.

Returning to FIG. 2, the cache controlling CPU 200, having locked the way to be refilled, instructs the DMA controller 300 that the texture data of the foregoing registered address be DMA transferred from the main memory 10 to the corresponding way of the secondary texture cache 400 (S20). After the completion of the DMA transfer, the cache controlling CPU 200 rewrites the corresponding cache tag of the secondary texture cache controller 500 (S22). Then, the way is unlocked. The secondary texture cache controller 500 restarts the way, and retries the read request to the texture unit 620 to 6n0 corresponding to the foregoing DMA transfer.

At step S12, if the target address matches with any one of the registered addresses (Y at S12), the current state of entry of the secondary texture cache 400 is maintained without entry lock for securing a way for refilling (S24). The cache controlling CPU 200 links the ID number of the texture unit 620 to 6n0 that has originated the read request, with the already-issued DMA transfer instruction having the matching address (S26). No DMA transfer instruction will be issued in response to this read request. When the secondary texture cache controller 500 restarts the refilled way, it also retries the read request from the texture unit 620 to 6n0 having the linked ID number. Subsequently, the foregoing processing is repeated until the rendering processing ends (Y at 328).

As above, according to the first operation example, it is possible to prevent texture data of the same address from being refilled overlappingly and the ways from being locked more than necessary. Consequently, the texture units 620 to 6n0 can read data from the secondary texture cache 400 without hindrance. Since unnecessary refills are avoided, it is possible to suppress the occurrence of thrashing in the secondary texture cache 400.

Figure 5:
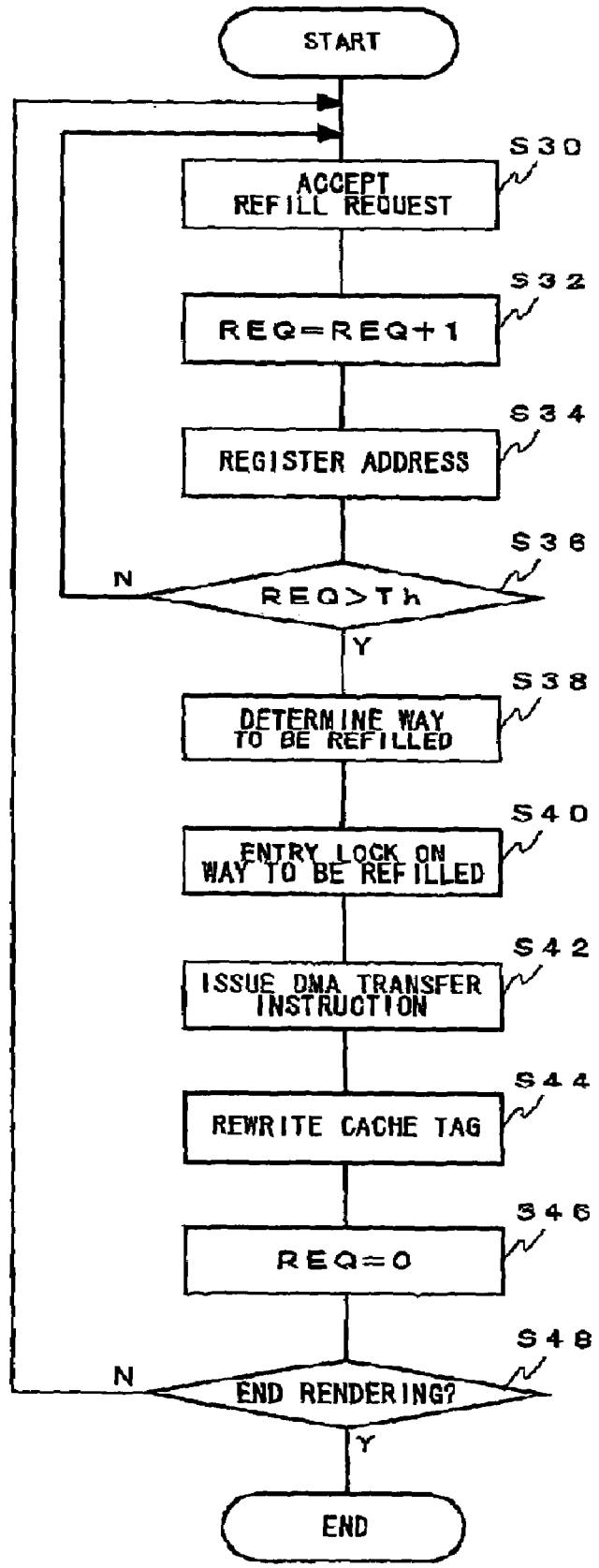
FIG. 5 is a flowchart showing a second operation example of the system according to the first embodiment.

FIG. 5 is a flowchart showing a second operation example of the system according to the first embodiment. Initially, the cache controlling CPU 200 accepts a refill request from the secondary texture cache controller 500 (S30). The refill request is generated by the same process as in the first operation example. Next, the cache controlling CPU 200 increments a parameter REQ for retaining the cumulative count of refill requests (S32). At the same time, the address pertaining to the refill request is registered to a not-shown register or the like (S34).

Next, whether or not the count retained in the parameter REQ exceeds a predetermined threshold is determined (S36). The optimum value for this predetermined threshold depends on such factors as the number of texture units 620 to 6n0 and the mode of scene transition. To be more specific, take a case where a plurality of texture units 620 to 6n0 perform texture mapping on a scene or an object. Some of the texture units 620 to 6n0 shall finish processing the scene or object, and start issuing a read request to the secondary texture cache 400 in order to start the processing of the nest scene or object. At this point, the rest of the texture units 620 to 6n0 are still processing the current scene or object.

In this state, suppose that the cache controlling CPU 200 issue, a DMA transfer instruction to the DMA controller 300 in accordance with a refill request corresponding to the read request. Then, the texture data that the rest of the texture units 620 to 6n0 are processing may be expelled from the secondary texture cache 400. If the texture data in process is expelled; a refill request must be issued to the cache controlling CPU 200 again. This puts the secondary texture cache 400 into a thrashing state. The predetermined threshold is thus preferably determined and set by tests or simulations as to how many refill requests should be accumulated before texture data for the next scene or object is refilled.

At step S36, if the count retained in the parameter REQ is lower than or equal to the predetermined threshold (N at S36), the acceptance of refill requests is continued without issuing the DMA transfer instruction (S30). If the predetermined threshold is exceeded (Y at S36), the cache controlling CPU 200 determines the target address to be replaced by the DMA transfer, i.e., the way to be replaced (S38). The cache controlling CPU 200 then locks entry to the determined way (S40). After the way to be refilled is locked, the cache controlling CPU 200 instructs the DMA controller 300 that the texture data of the foregoing registered address be DMA transferred from the main memory 10 to the corresponding way of the secondary texture cache 400 (S42). After the completion of the DMA transfer, the cache controlling CPU 200 rewrites the corresponding cache tag of the secondary texture cache controller 500 (S42). Then, the way is unlocked The secondary texture cache controller 500 restarts the way, and retries the read request to the texture unit 620 to 6n0 corresponding to the foregoing DMA transfer.

Next, the cache controlling CPU 200 initializes the parameter REQ (S46). Subsequently, the foregoing processing is repeated until the rendering processing ends (Y at S48). In the foregoing processing, if refill requests more than the number of refill ways concentrate on an identical line, subsequent refill request are reserved to postpone the refill processing to the next time. In this case, the texture units corresponding to the reserved refill requests are suspended at the time of restart.

As above, the second operation example has dealt with the case where some of the texture units 620 to 6n0 are to process the next scene or object, having finished the texture mapping on the current scene or object, while some are processing the current scene or object. In this situation, the cache controlling CPU 200 can schedule refills to suppress the occurrence of thrashing in the secondary texture cache 400. In addition, the plurality of texture units 620 to 6n0 for processing the next scene or object can all start texture mapping simultaneously when the texture data intended for that processing is refilled. That is, it is possible to suppress deviations at the start of the texture mapping.

The present embodiment may also be applied to graphic processing of a game program. For example, in a technique of graphic processing of a game program, the entire texture data is loaded on the main memory. The game program transfers texture data to an area of the EDRAM allocated for texture data in advance. Then, the texture data is read from the EDRAM and used for texture mapping by draw commands entered. This technique allows effective use of the limited EDRAM.

Nevertheless, this technique is predicated on that the game program previously recognizes which part of texture data in the main memory will be read by the draw commands. Besides, in cases where the intended texture data is too large to be accommodated in the texture data storing area of the EDRAM, it is also provided that the texture data is divided and edited into EDRAM-adaptable sizes at the development stage of the game program.

In contrast, according to the cache control of the present embodiment, texture data can be rendered without a drop in efficiency even if the part of the data to be read is determined after the game program is run, as is the case with font data. It is also unnecessary to tailor the texture data to the size of the EDRAM at the development stage of the game program.

Since the caches are controlled by software, not by hardware, it is possible to exercise control with minimum thrashing even in the case of accessing a main memory lying outside the graphic chip with a high latency.

Figure 6:
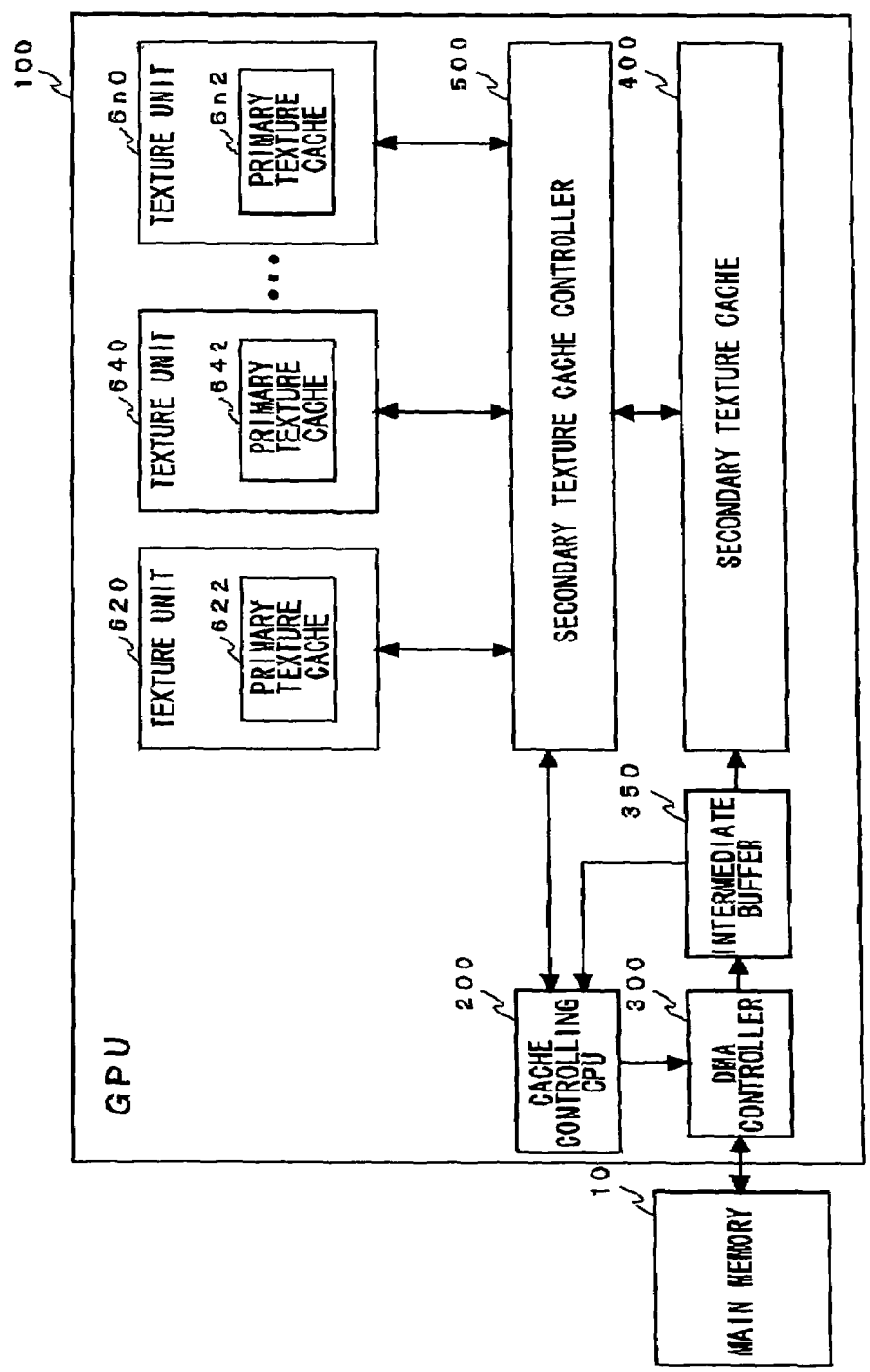
FIG. 6 is a block diagram showing the configuration of a main memory and a GPU according to a second embodiment.

FIG. 6 is a block diagram showing the configuration of a main memory 10 and a GPU 100 according to a second embodiment. FIG. 6 shows a configuration in which an intermediate buffer 350 is added to between the DMA controller 300 and the secondary texture cache 400 of the configuration of FIG. 1. Since the components other than the intermediate buffer 350 are the same as in FIG. 1, description thereof will be omitted here. The intermediate buffer 350 is a memory area which temporality stores texture data to be refilled from the main memory 10 to the secondary texture cache 400 by the DMA controller 300. When the texture data is stored, the intermediate buffer 350 issues a control signal for informing the cache controlling CPU 200 of it. Then, at the same time with or after a predetermined delay since the issuance of the control signal, the intermediate buffer 350 outputs the stored texture data to the secondary texture cache 400.

Figure 7:
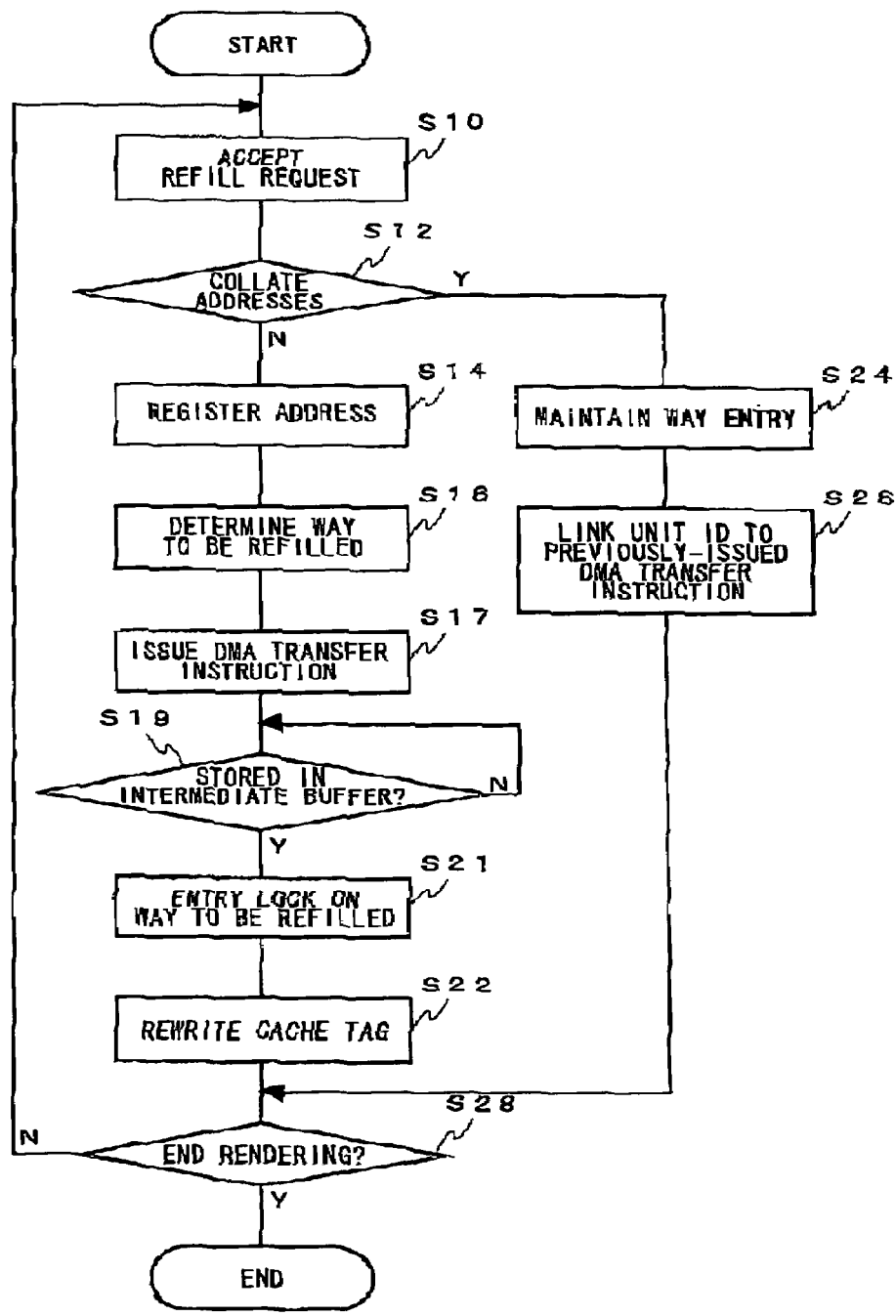
FIG. 7 is a flowchart showing an operation example of the system according to the second embodiment.

FIG. 7 is a flowchart showing an operation example of the system according to the second embodiment. The flowchart of FIG. 7 is basically the same as that of FIG. 2. The following description will thus deal with differences therebetween. Initially, the processing up to step 516 is the same as described in FIG. 2. In FIG. 7, the cache controlling CPU 200 determines the way to be refilled. Then, the cache controlling CPU 200 instructs the DMA controller 300 that the texture data of the foregoing registered address be DMA transferred from the main memory 10 to the corresponding way of the secondary texture cache 400, without locking entry to the way (S17).

Under this instruction, the DMA controller 300 sends out the texture data toward the secondary texture cache 400. Consequently, the texture data is stored into the intermediate buffer 350 which lies on the path. When the texture data is stored, the intermediate buffer 350 issues a control signal for informing the cache controlling CPU 200 of it. When the cache controlling CPU 200 receives this control signal (Y at S19), it locks entry to the foregoing way to be refilled (S21). In other words, the entry to the way will not be locked until this control signal is received. The rest of the processing is the same as described in FIG. 2.

As above, according to the second embodiment, the entry to the way to be refilled will not be locked until the texture data is stored into the intermediate buffer 350. Consequently, the texture units other than that requiring the texture data can be given an entry time longer than in the first embodiment. This allows an improved cache hit rate, which can suppress the occurrence of thrashing in the secondary texture cache 400. The present embodiment is particularly effective when the system between the main memory 10 and the secondary texture cache 400 is long and has a high latency.

Figure 8:
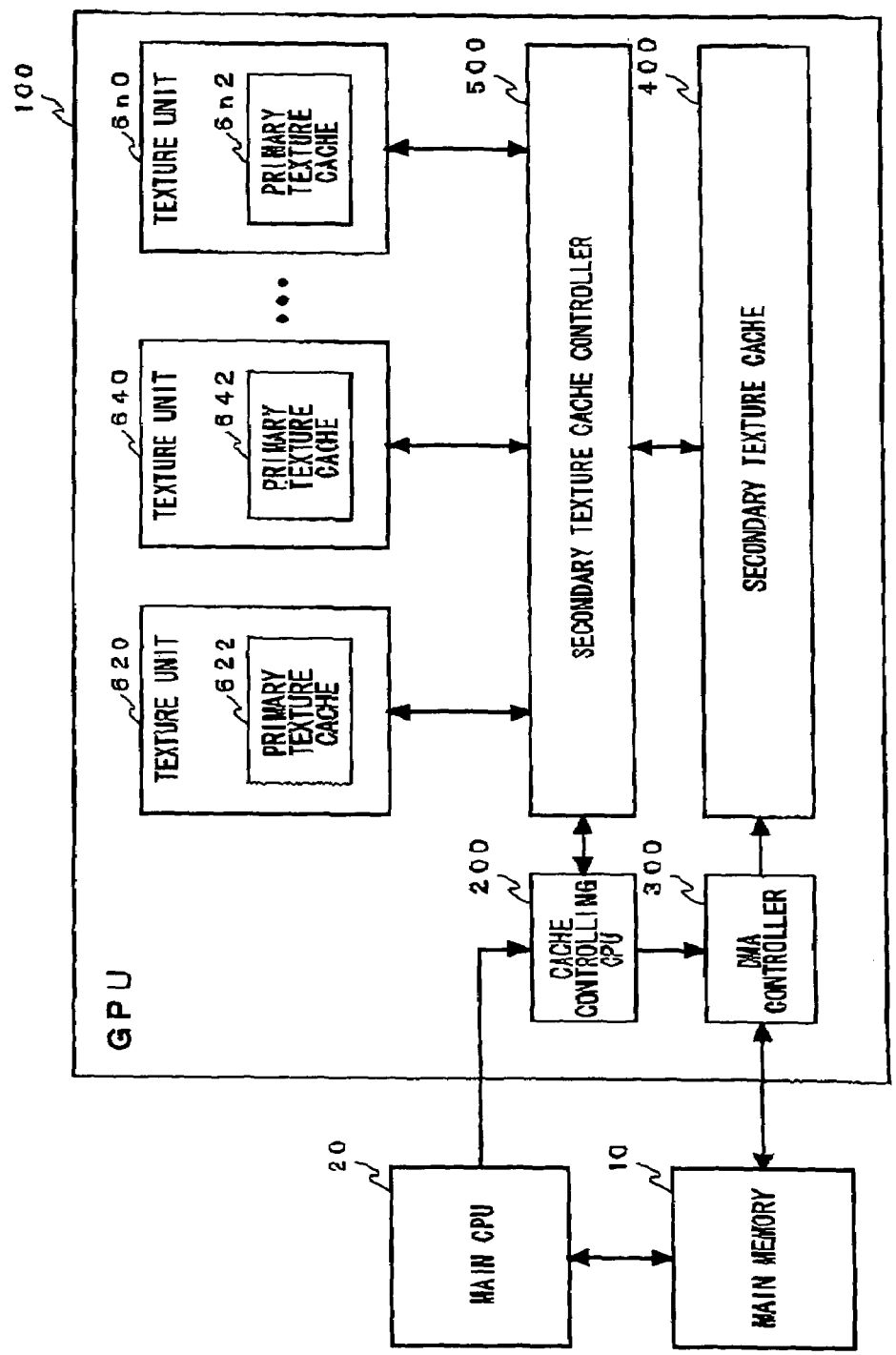
FIG. 8 is a block diagram showing the configuration of a main memory, a main CPU, and a GPU according to a third embodiment.

FIG. 8 is a block diagram showing the configuration of a main memory 10, a main CPU 20, and a GPU 100 according to a third embodiment. FIG. 8 shows a configuration in which a main CPU 20 is added to the configuration of FIG. 1. Since the components other than the main CPU 20 are the same as in FIG. 1, description thereof will be omitted here. The main CPU 20 executes a program such as a game program, and predicts next texture data necessary for the texture units 620 to 6n0 in performing the texture mapping of the program. The main CPU 20 generates a DMA transfer instruction for prefetching this texture data from the main memory 10 to the secondary texture cache 400, and outputs it to the cache controlling CPU 200. The cache controlling CPU 200 issues this DMA transfer instruction to the DMA controller 300.

Figure 9:
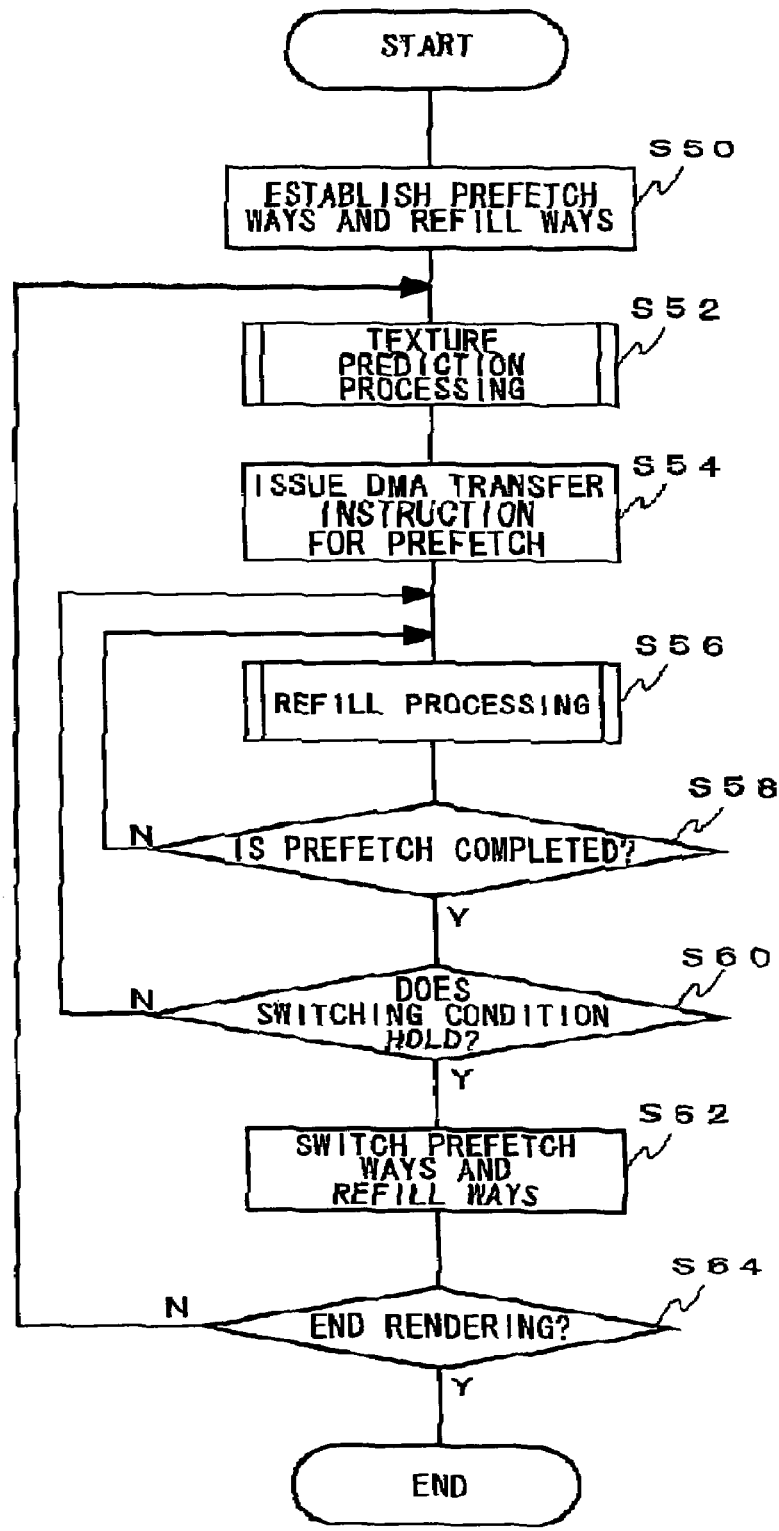
FIG. 9 is a flowchart showing a first operation example of the system according to the third embodiment.
Figure 10:
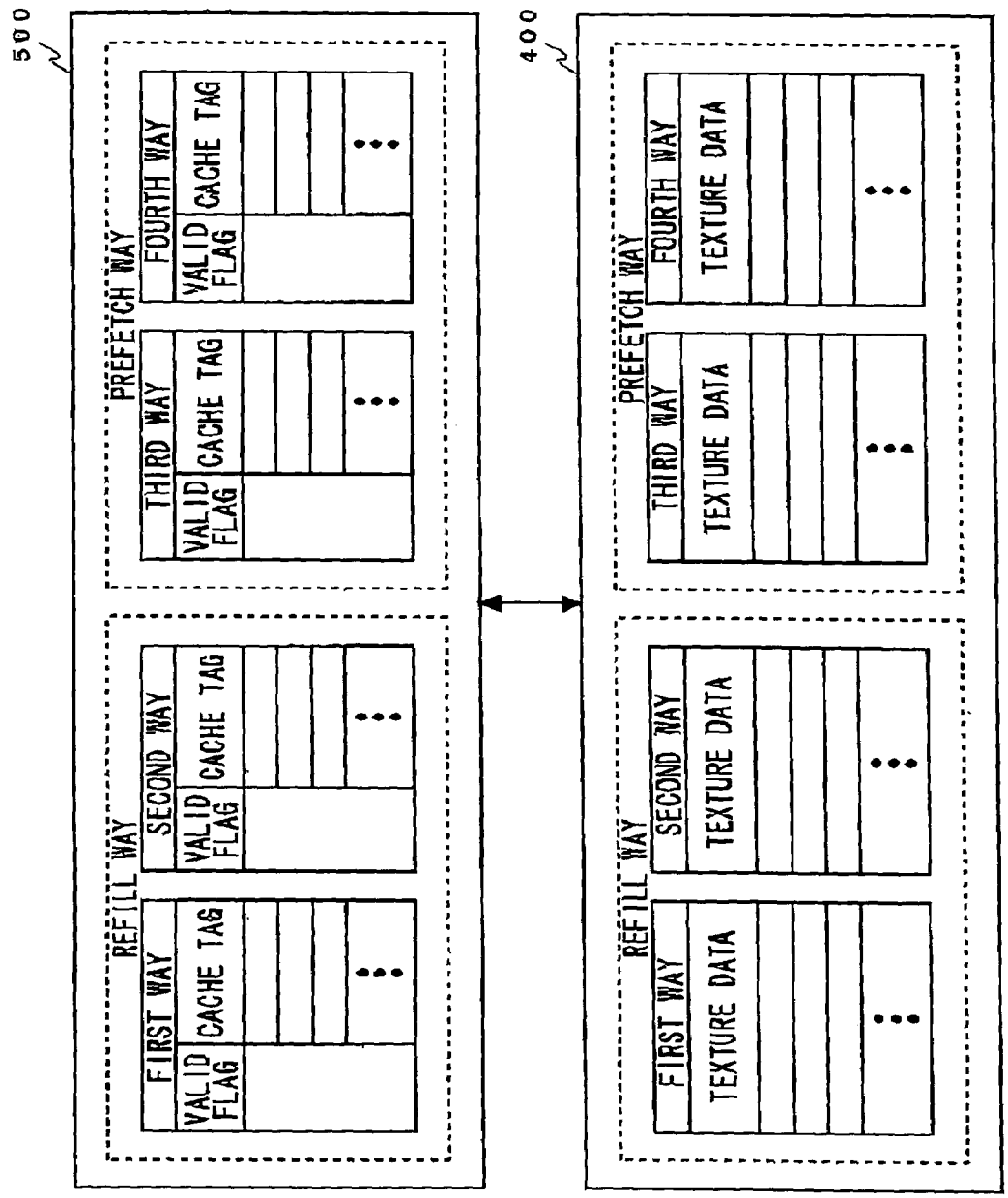
FIG. 10 is a diagram showing the details of a secondary texture cache and a secondary texture cache controller in the operation example of FIG. 9.

FIG. 9 is a flowchart showing a first operation example of the system according to the third embodiment. Initially, the cache controlling CPU 200 divides a plurality of ways of the secondary texture cache 400 into prefetch ways and refill ways (S50). FIG. 10 shows the details of the secondary texture cache 400 and the secondary texture cache controller 500 in this operation example. In FIG. 10, the first way and the second way out of the four ways are used as the refill ways. The third way and the fourth way are the prefetch ways.

The refill ways are ways issuing a refill request when a cache miss occurs from read requests from the texture units 620 to 6n0 as described above. Entry to these ways is locked during refill processing. In the meantime, the prefetch ways are ways for reading texture data required by the texture units 620 to 6n0 to the secondary texture cache 400 in advance based on the prediction of the main CPU 20. The entry period and entry lock period of the prefetch ways are set by the control of the cache controlling CPU 200 irrespective of cache misses.

Returning to FIG. 9, the main CPU 20 or the cache controlling CPU 200 executes processing for predicting necessary texture data (S52). This prediction processing will be detailed later. A DMA transfer instruction including the address of the texture data on the main memory 10, determined by this prediction processing, is issued to the DMA controller 300 (S54). Under this DMA transfer instruction, a prefetch is performed on the prefetch ways of the secondary texture cache 400. Here, the valid flags of the prefetch ways are set at 0 for entry lock.

Simultaneously with this processing, the refill ways, the cache controlling CPU 200, and the DMA controller 300 perform refill processing (S56). This refill processing has been detailed in the first embodiment. Incidentally, in FIG. 8, the intermediate buffer 350 described in the second embodiment may be interposed between the DMA controller 300 and the secondary texture cache 400. This can provide longer entry periods.

Next, the cache controlling CPU 200 determines whether the prefetch is completed or not (S58). If the prefetch is completed (Y at S58), the cache controlling CPU 200 rewrites the cache tags and the valid flags. Rewriting a valid flag with "1" enables entry to that way.

The main CPU 20 or the cache controlling CPU 200 determines whether or not the condition for switching the prefetch ways and the refill ways holds (S60). An example of this switching condition is that a predetermined period elapses since the completion of a prefetch. Alternatively, the main CPU 20 may identify or predict a scene transition, an object transition, or the like. The ways may then be switched at timing determined by subtracting the DMA transfer time from the time of the foregoing transition so as not to lock the entry to the ways more than necessary. If the ways are switched too earlier than the transition, prefetched texture data might sometimes be expelled. An optimum condition may thus be determined by tests or simulations so as not to cause such thrashing.

If the switching condition holds (Y at S60), the cache controlling CPU 200 switches, the prefetch ways and the refill ways (S62). Specifically, the valid flags of the current refill ways are set at 0 for entry lock. Subsequently, the foregoing processing is repeated until the rendering processing ends (Y at S64). Incidentally, w this operation example has dealt with the operation of switching the prefetch ways and refill ways, the ways may be dedicated to their respective purposes.

Figure 11:
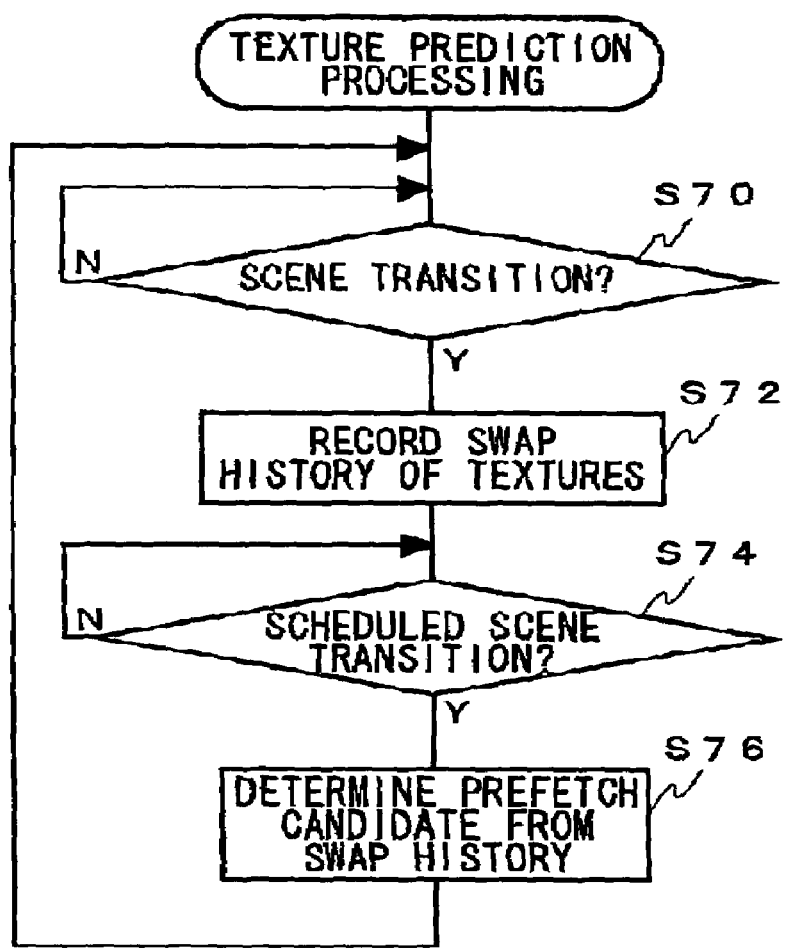
FIG. 11 is a flowchart showing a first example of the processing for predicting texture data.

Next, description will be given of the processing mentioned at step S52, in which texture data for a prefetch is predicted. FIG. 11 is a flowchart showing a first example of the processing for predicting the texture data. Initially, at a scene transition (Y at S70), the cache controlling CPU 200 stores the texture data prefetched at this time into a not-shown RAM or the like as a swap history (S72).

When the cache controlling CPU 200 reaches the estimated time of the scene transition (Y at S74), it consults the foregoing swap history and determines the texture data to be prefetched (S76). For example, when texture data to be used at every scene transition is detected, the texture data is determined to be the data to be prefetched. This processing provides a technique for learning and determining texture data to be prefetched. Incidentally, object transitions and the like may also be learned in the same manner.

The cache controlling CPU 200 may also record a swap history of refills along with that of prefetches. Learning refill swaps allows adaptive modification of the threshold for determining the refill timing which has been described in the second operation example of the first embodiment. For example, it is possible to exercise such control am increases the threshold to delay the refill timing when refills for an identical address are repeated in a short time, is , when in a thrashing state As above, according to the first example of the prediction processing, the texture data to be prefetched can be determined through learning control. This allows precise prediction even when necessary texture data is hard to determine by program decoding, such as when objects to be rendered vary depending on user inputs.

Figure 12:
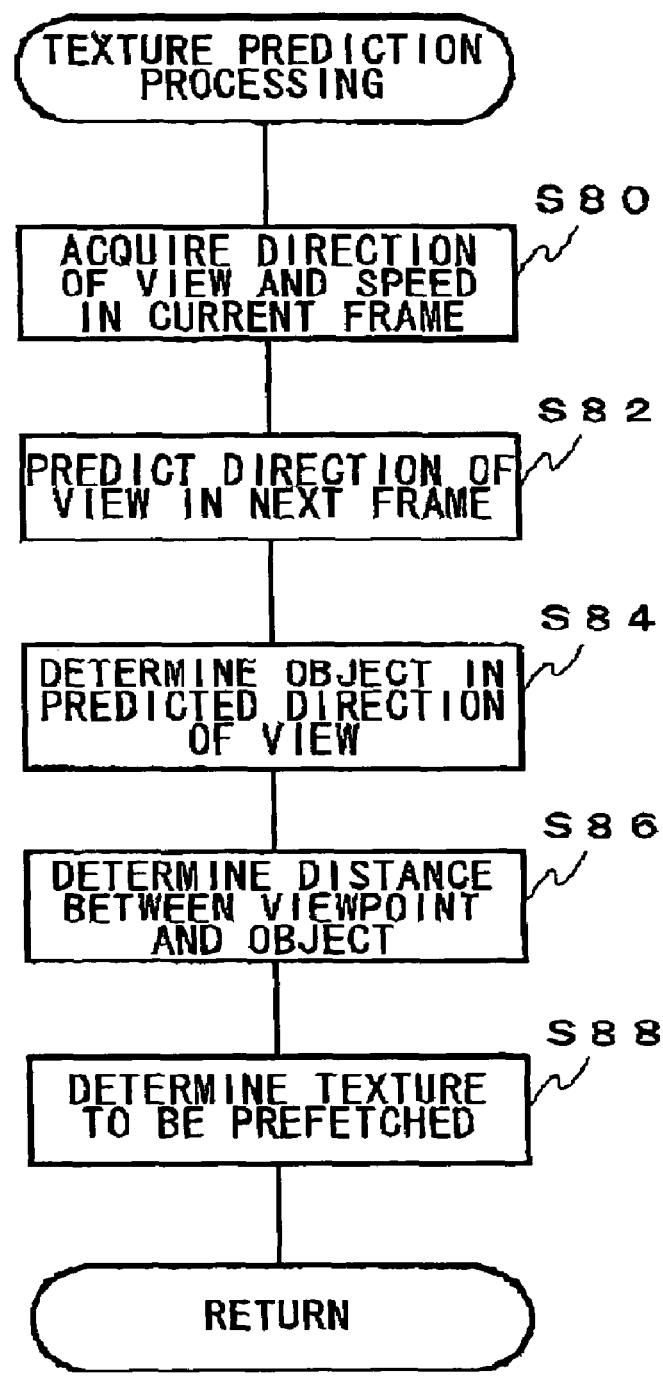
FIG. 12 is a flowchart showing a second example of the processing for predicting texture data.

FIG. 12 is a flowchart showing a second example of the processing for predicting the texture data. The second example is applicable to the cases of predicting texture data on the ground surface or the like. Initially, the main CPU 20 acquires the direction of view, or the angle, from a viewpoint which is established within the current frame, and the speed of movement of the viewpoint from the currently running program (380). Based on these, the CPU 20 predicts the direction of view from the viewpoint in the next frame (S82). The CPU 20 determines an object lying in this predicted direction of view (S84). The CPU 20 also determines the distance between this object and the viewpoint (SB6). Once the distance is determined, it is possible to determine the level of detail (LOD) of the texture data necessary to render the object. The texture data to be prefetched is determined thus (S88).

As above according to the second example of the prediction processing, it is possible to predict next necessary texture data through the calculation of the parameters that indicate the current situation, without decoding the next program command to be executed.

Consequently, according to the third embodiment, it is possible to divide the secondary texture cache 400 into prefetch ways and refill ways, and use them in a double-buffer fashion. This allows a reduction in refill time.

Now, description will be given of a fourth embodiment. The same system configuration as that shown in Fig, 8 may be used for the fourth embodiment. Moreover, the fourth embodiment is also applicable even with one single texture unit 620.

Figure 13:
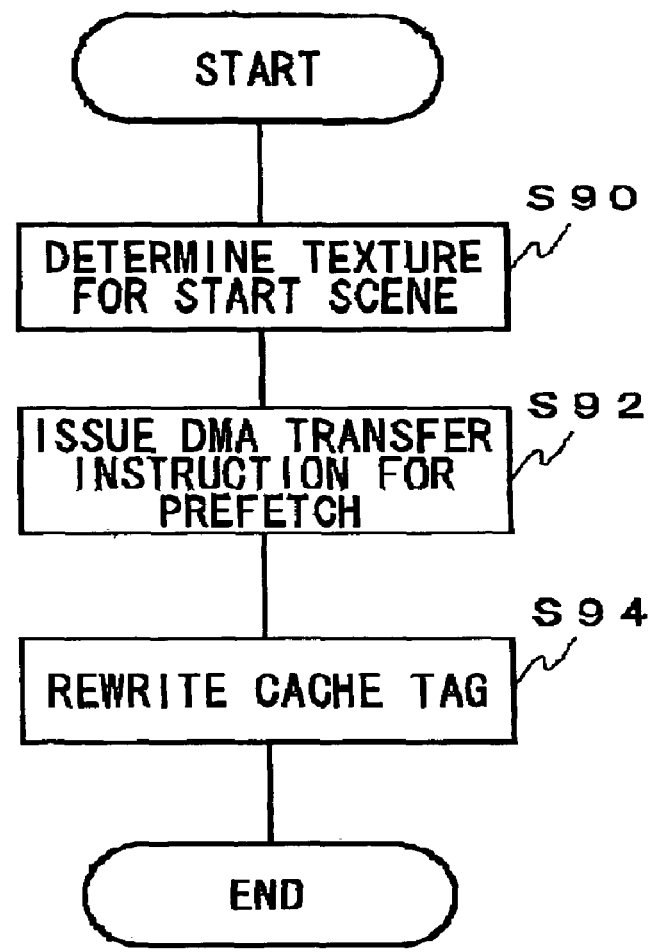
FIG. 13 is a flowchart showing an operation example of the system according to a fourth embodiment.

FIG. 13 is a flowchart showing an operation example of the system according to the fourth embodiment. Initially, before starting the execution of a program, the main CPU 20 determines the texture data for rendering a start scene. This is predicated on that which object is to be rendered and what texture data of that object is necessary are often known before starting rendering.

The cache controlling CPU 200 issues a DMA transfer instruction including the address of the texture data on the main memory 10, determined by the main CPU 20, to the DMA controller 300 (S92). At the same time, the cache controlling CPU 200 rewrites the cache tag of the prefetched way (S94). Incidentally, the present embodiment is also applicable to operations after resetting.

As above, according to the fourth embodiment, it is possible to minimize cache misses at the beginning of rendering, thereby allowing efficient use of the secondary texture cache 400.

Up to this point, the present invention has been described in conjunction with the embodiments thereof. It should be noted that the present invention is not limited to these embodiments, and various modifications thereof are also applicable as aspects of the present invention. For example, the foregoing description has been dealt with the cases where the secondary texture cache 400 is provided with four ways. In this respect, the number of ways is not limited to four, but may be set arbitrarily. The number of prefetch ways and the number of refill ways may also be set freely. Ways dedicated to a prefetch or a refill may be provided.

Moreover, the cache control of the present invention is not limited to the application to the processing of reading texture data by a plurality of texture units implemented in a GPU. It is applicable to any configuration in which a common cache memory is used by a plurality of processors. The cache control of the present invention is particularly effective when the system between the main memory and the cache memory is long and thus causes a high latency. For example, it is effective for such configurations that the main memory of a server on the Internet is accessed to read data to the cache memory on a client.

What is claimed is:

1. An information processing apparatus comprising:
    a cache memory having a plurality of ways for storing part of data in a main memory, the cache memory being used commonly by a plurality of operating units;
    a cache management unit which manages cache tags and states of entry for the respective ways; and
    a control unit which controls a refill operation from the main memory to the cache memory and the states of entry in accordance with a refill request from the cache management unit, the refill request occurring from at least one cache miss from the plurality of operating units, predicts texture data to be used by the plurality of operating units and controls a prefetch operation of the predicted texture data from the main memory to the cache memory, wherein
    the cache memory is divided into an area to be refilled in accordance with the cache miss, and an area to be prefetched.

2. The information processing apparatus according to claim 1, wherein
    the control unit suppresses occurrence of the refill operation when the plurality of operating units access an identical memory address with a predetermined time difference.

3. The information processing apparatus according to claim 1, wherein
    the control unit suspends the refill operation corresponding to the refill request of the second henceforth when the control unit receives a plurality of refill requests to an identical memory address.

4. The information processing apparatus according to claim 1, wherein
    the control unit suspends entry lock corresponding to the refill request of the second henceforth when the control unit receives a plurality of refill requests to an identical memory address.

5. The information processing apparatus according to claim 1, wherein
    the control unit performs the refill operation when a predetermined number of refill requests occurring from cache misses accumulates.

6. An information processing apparatus according to claim 1, further comprising:
    an intermediate buffer interposed between the main memory and the cache memory, wherein the control unit controls the refill operation from the main memory to the cache memory via the intermediate buffer in accordance with the refill request, and
    sets entry lock corresponding to the refill request on the cache memory when data to be passed to the cache memory by the refill operation is stored into the intermediate buffer.

7. The information processing apparatus according to claim 1 wherein the control unit switches the two areas when a predetermined period elapses since a completion of a prefetch.

* * * * *

UNITED STATES PATENT AND TRADEMARK OFFICE
CERTIFICATE OF CORRECTION

PATENT NO. : 7,644,234 B2 Page 1 of 1
APPLICATION NO. : 11/141700
DATED : January 5, 2010
INVENTOR(S) : Sasaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1128 days.

Signed and Sealed this

Twenty-first Day of December, 2010

David J. Kappos
*Director of the United States Patent and Trademark Office*